United States Patent [19]

Rossnick

[11] 4,001,725
[45] Jan. 4, 1977

[54] HIGH POWER R.F. INDUCTION HEATING GENERATOR

[75] Inventor: Melvin Rossnick, Bronx, N.Y.

[73] Assignee: Lepel High Frequency Laboratories, Inc., Maspeth, N.Y.

[22] Filed: Dec. 12, 1975

[21] Appl. No.: 640,283

[52] U.S. Cl. .................. 331/117 R; 219/10.75; 331/168; 331/185

[51] Int. Cl.² .................. H03B 5/12; H05B 5/08

[58] Field of Search .......... 331/113 A, 117 R, 168, 331/185; 219/10.75, 10.77

[56] References Cited

UNITED STATES PATENTS

| | | | |
|---|---|---|---|
| 2,888,525 | 5/1959 | Eckess et al. | 330/18 X |
| 2,926,307 | 2/1960 | Ehret | 330/18 |
| 2,953,754 | 9/1960 | Roesel, Jr. | 331/113 A |
| 2,999,984 | 9/1961 | Beck | 330/18 |
| 3,046,495 | 7/1962 | Faries et al. | 331/113 A |
| 3,210,689 | 10/1965 | Burwen | 331/113 A |
| 3,441,875 | 4/1969 | Shoh | 331/117 R |

*Primary Examiner*—Siegfried H. Grimm

[57] ABSTRACT

A high power R.F. induction heating generator for inductively heating a load including a plurality of transistors of the same type series connected in a self-exciting class "C" oscillator configuration, a tank circuit having a tank coil electrically coupled to the output of the transistors, the tank coil having an impedance which matches the output impedance of the transistors and being adapted to be inductively coupled to the load for providing an oscillating R.F. voltage signal thereto, and a feedback transformer including a primary winding and a plurality of secondary windings corresponding in number to the plurality of transistors, the primary winding being coupled to the tank circuit and the secondary windings being uniformly and substantially identically wound over the primary winding and coupled to the bases of their respective transistors to provide input voltages having equal phases and amplitudes to each of the transistors for synchronizing the conduction and non-conduction periods of the transistors for delivering equal shares of the total power to a load.

11 Claims, 6 Drawing Figures

HIGH POWER R.F. INDUCTION HEATING GENERATOR

The present invention relates to induction heating apparatus, and more particularly to a high power R.F. induction heating generator.

Generally, existing induction heating generators utilize a single transistor in a self-excited class "C" oscillator circuit to attain power outputs of approximately 100 watts into the megahertz frequency range. See the article entitled, "Designing R.F. Power Sources" by R. S. Myers (EEE, November 1968). However, the power output required for small induction heating applications generally begins at a few hundred watts, e.g., 300 to 1000 watts, output. Multiple transistors having been employed to obtain higher power outputs for induction heating applications. A method of employing multiple transistors to obtain higher power outputs for induction heating applications is connecting the multiple transistors in parallel and broad banding the multiple transistors for operation into a common load.

However, known multiple transistor arrangements for obtaining higher power outputs for induction heating applications have been less than satisfactory in that they do not efficiently provide high reactive power in the "tank" circuit to facilitate the efficient transmission of power to a load by induction.

It is known that multiple series connected transistors can be employed in invertors or oscillators to increase or switch power to a load, see U.S. Pat. Nos. 2,953,754 (Roesel, Jr.) and 3,441,875 (Shoh). However, such multiple transistor arrangements are generally not suitable for induction heating applications, since these series connected transistors are not precisely synchronized with respect to their conduction and non-conduction times.

It is an object of the present invention to provide a high power R.F. induction heating generator.

It is a further object of the present invention to provide an R.F. induction heating generator which provides a high reactive power in the tank circuit to facilitate the efficient transmission of power to a load by induction.

It is a still further object of the present invention to utilize the advantages of multiple series connected transistors in an induction heating generator.

It is a still further object of the present invention to provide a portable high power R.F. induction heating generator.

Briefly, the induction heating generator in accordance with the present invention includes a plurality of transistors of the same type series connected in a self-exciting class "C" oscillator configuration, a tank circuit having a tank coil electrically coupled to the output of the transistors, the tank coil having an impedance which matches the output impedance of the transistors and being adapted to be inductively coupled to the load for providing an oscillating R.F. voltage signal thereto, and a feedback transformer including a primary winding and a plurality of secondary windings corresponding in number to the plurality of transistors, the primary winding being coupled to the tank circuit and the secondary windings being uniformly and substantially identically wound over the primary winding and coupled to the bases of their respective transistors to provide input voltages having equal phases and amplitudes to each of the transistors for synchronizing the conduction and non-conduction periods of the transistors for delivering equal shares of the total power to a load.

The preferred embodiment of the invention is illustrated in the drawings. However, it should be expressly understood that the preferred embodiment should be considered as only illustrative of the features of the present invention, and the present invention should not be construed as being limited solely to the preferred embodiment. The drawings are as follows.

Figure 1:
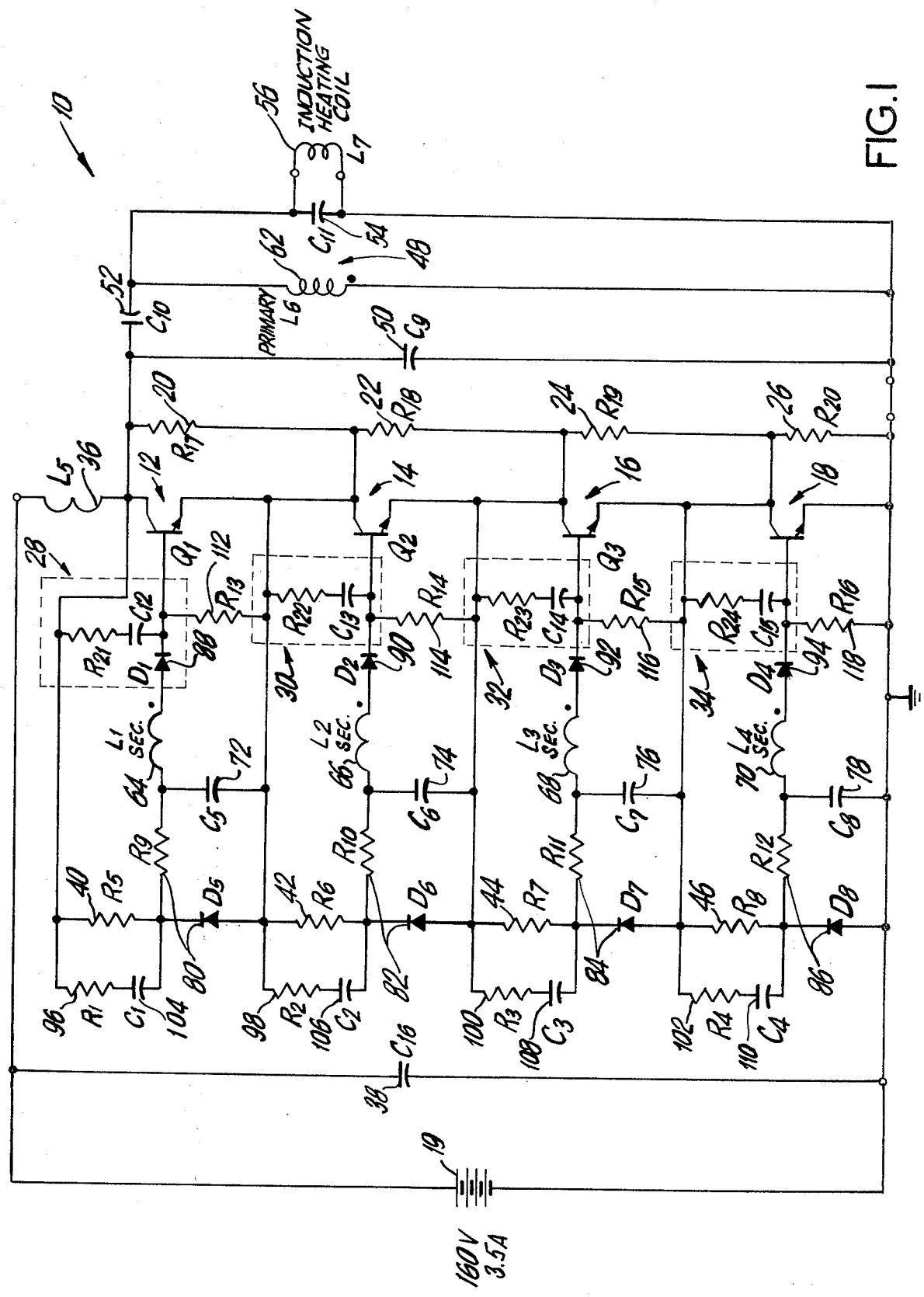
FIG. 1 is a schematic of a high power R.F. induction heating generator in accordance with the present invention.

Referring to FIG. 1, a high power R.F. induction heating generator in accordance with the present invention is generally illustrated at 10. The induction heating generator 10 as shown includes four transistors 12–18. However, it should be understood that the number of transistors may vary depending on the output power desired. For example, six or eight transistors may be employed. The transistors 12–18 are of the same type (NPN) and preferably are high current, high speed power transistors such as number 2N6496, available from RCA. The transistors 12–18 are series connected in a self-excited class "C" oscillator configuration in which the transistors 12–18 conduct over a period less than one-half cycle of their output frequency. With this configuration the input voltage to the transistors 12–18 is increased by "N" times the voltage limit for a single transistor. Likewise, the input and output power of the transistors 12–18 is increased by the factor "N".

A 160-volt D.C. power supply 19 at 3.5 amps. provides the bias voltages for the transistors 12–18. Although the power supply 19 is shown as a battery, in actual practice rectified A.C. is used to supply power to the transistors 12–18.

The D.C. supply voltage is equally distributed among the four transistors 12–18 by series connected resistors 20–26 coupled between the collector and emitter of each of transistors 12–18, respectively. As shown in dotted outline, R-C networks 28–34 can be connected between the base and collector of the transistors 12–18 to reduce any R.F. voltage unbalance. The R-C networks 28–34 remove spikes from the R.F. voltages appearing across the respective transistors 12–18.

A choke 36 electrically couples the power supply 19 to the collector of transistor 12 of the series connected transistors 12–18. The choke 36 permits D.C. to flow to the transistors 12–18 while providing a high impedance path to impede the flow of any R.F. current back to the power supply 19. Additionally, a capacitor 38 coupled across the power supply 19 provides a low impedance path to R.F. current for diverting the same from the power supply 19. Thus, the power supply 19 is effectively isolated from any R.F. currents by the choke 36 and capacitor 38.

Conduction in the transistors 12–18 begins as a result of the forward bias provided by resistors 40–46 coupled between the collector and base of each of the transistors 12–18, respectively. Simultaneously, shock excitation effects which result from applying D.C. power to the transistors 12–18 cause oscillation of their output voltages at a frequency determined by the tank circuit 48. This R.F. voltage generated in the tank circuit 48 is maintained by the self-oscillating nature of the generator 10.

As shown in FIG. 1, the tank circuit 48 includes voltage divider capacitors 50, 52, and 54 and an induction heating coil 56 connected in parallel with capacitor 54. Capacitors 50 and 52 serve as a capacitive divider so that the voltage of the coil 56 approaches the voltage of the D.C. power supply 19. This oscillation frequency of the tank circuit 48 may be determined as follows:

$$f \cong \frac{1}{2\pi \sqrt{L_{56} \left( C_{54} + \frac{C_{50} \times C_{52}}{C_{50} + C_{52}} \right)}}$$ (neglecting the inductance of the primary coil 62 of feedback transformer 58)

Advantageously, the tank circuit 48 has a Q between about 3 and about 20.

Figure 3:
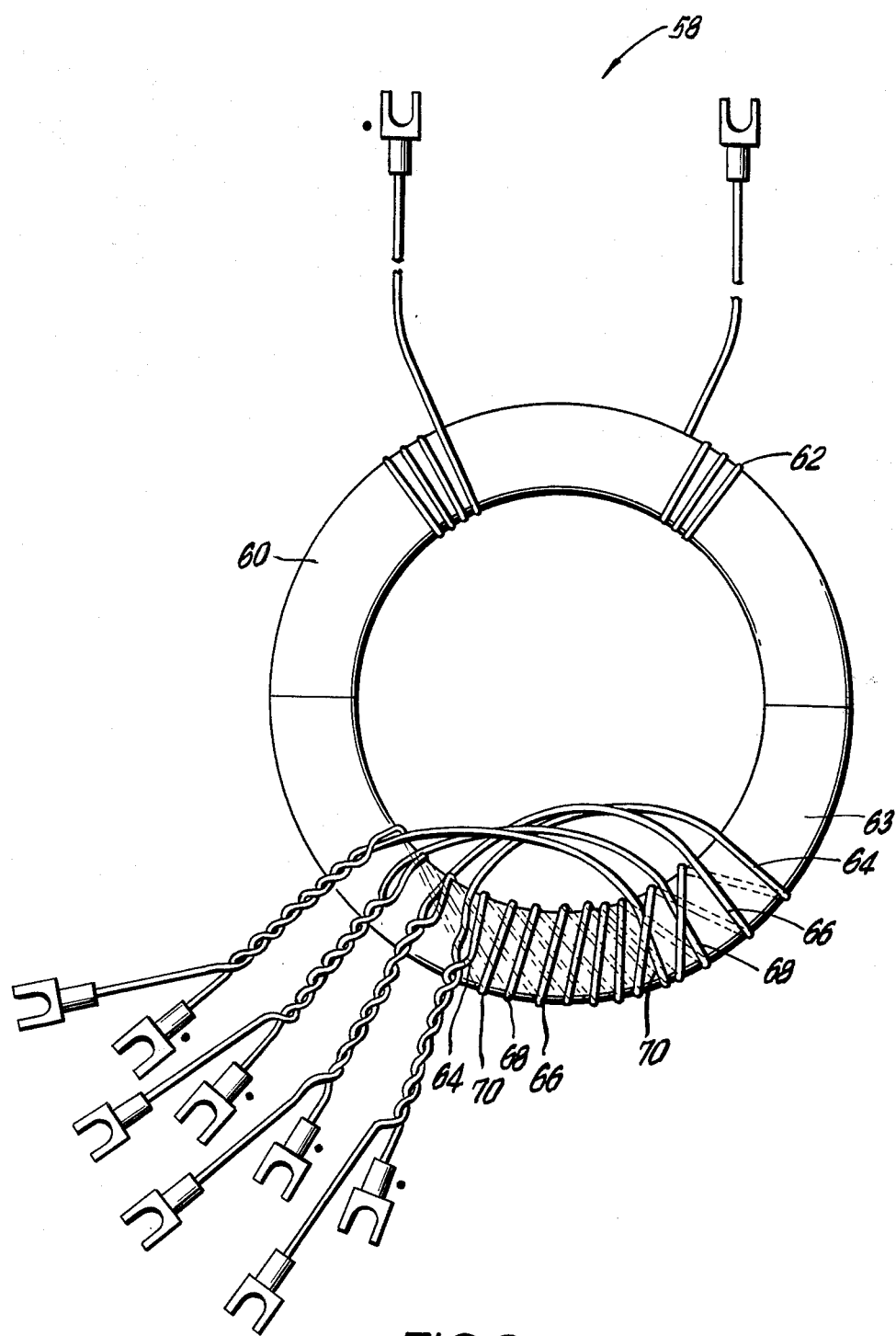
FIG. 3 is a perspective view of the toroidal feedback transformer of the present invention.

Referring also to FIG. 3, to provide synchronous conduction of the series connected transistors 12-18 a feedback transformer 58 is provided. The feedback transformer 58 is preferably in the shape of a toroid 60 having a carbonyl iron core. The primary coil 62 of the transformer 58 is uniformly wound around the toroid 60, e.g., with 75 turns of magnet wire. Two layers of masking tape 63 are then wound over a 180° sector of the toroid 60. "N" secondary coils, 64–70, equal in number to the transistors used, 12–18, are uniformly and substantially identically wound, e.g., 2½ turns each, over the primary coil 62 covered by the masking tape 63, here quadfilar wound. The secondry coils 64–70 are electrically connected to the bases of transistors 12–18, respectively. The secondary coils 64–70 are electrically matched to provide near identical output voltages and phase relationships for the base to emitter voltages applied to the transistors 12–18. These secondary voltages are in time phase with each other, but 180° out of phase with the primary voltage.

Capacitors 72–78 provide reverse bias voltages to the respective transistors 12–18 (base to emitter). During the positive portion of the cycle of the secondary voltages, the capacitors 72–78 are charged. During the negative portion of the cycle of the secondary voltages the capacitors 72–78 discharge through diode-resistor networks 80–86 to reverse bias the bases and emitters and prevent conduction. Specifically, when the polarity of the voltages applied to the base-emitter circuit of each transistor 12–18 from the feedback windings 64–70 is positive, current flows to charge capacitors 72–78 negatively. The negative charge on the capacitors 72–78 will reverse-bias the transistors 12–18 to prevent conduction between the collector-emitter circuits. The time constants of the capacitors 72–78 and diode-resistor networks 80–86 provide an average negative bias voltage $-E_{B-E}$, see FIG. 2D. Thus, the negative displacement of the R.F. voltage ($E_{Base-Emitter}$ below the zero line) provides a portion of the feedback voltage having a positive polarity for less than one-half cycle during the conduction time of the transistors 12–18, see FIG. 2D.

Advantageously, diodes 88–94 connected in series with the bases of transistors 12–18 limit the base to emitter voltage applied to $-E_{B-E}$ when the transistors 12–18 are non-conducting. Preferably, the diodes 88–94 have fast switching capability and low storage times, since they operate at the generated R.F. frequency.

Resistors 96–102 and capacitors 104–110 coupled between the base and collector of each transistor 12–18, respectively, and resistors 112–118 coupled between the base and emitter of each transistor 12–18, respectively, introduce negative feedback to their respective transistors 12–18 and provide equalization of the R.F. voltage across the transistors 12–18.

Thus, collector current flows through the transistors 12–18 periodically and for a period less than one-half the cycle of the generated R.F. voltage. The resulting collector current is substantially a sharp pulse which shock excites the tank circuit 48 during each cycle. This synchronous turning "on" and "off" of each transistor 12–18 with respect to the R.F. tank voltage provides equal distribution or sharing of the total R.F. voltage applied to the transistors 12–18 (collector to emitter and collector to base). Thus, the multiple transistors 12–18 function as a single large transistor with each transistor equally sharing the load (induction heating coil 56) and delivering an equal share of the power output to the load. For proper output the impedance of the tank circuit 48 is chosen to match the output impedance of the transistors 12–18. Moreover, by utilizing balancing elements and the feedback transformer 58 each transistor 12–18 is synchronized with equal conduction and non-conduction periods.

Suggested values for the passive elements shown in FIG. 1 are as follows:

| Diodes | Values or Type |
|---|---|
| Diodes 80–86 | MR 854 |
| Diodes 88–94 | MR854 |
| Resistors | |
| Resistors 20–26 | 4.7kΩ, 2 watt |
| Resistors 28–34 | Preset values of 0 to 1kΩ |
| Resistors 40–46 | 1.5kΩ, 12 watt |
| Resistors 80–86 | 47Ω, 2 watt |
| Resistors 96–102 | 250Ω, 12 watt |
| Resistors 112–118 | 47Ω, ½ watt |
| Capacitors | |
| Capacitor 38 | 1600 MFD-350V Electrolytic |
| Capacitors 28–34 | Preset values of 0 to .1 MFD MICA |
| Capacitor 50 | .06 MFD MICA |
| Capacitor 52 | .06 MFD MICA |
| Capacitor 54 | .1MFD MICA |
| Capacitors 72–78 | .15 MFD 400V |
| Capacitors 104–110 | .15 MFD 400V |
| Inductors | |
| Inductance 36 | 20 microhenries |
| Inductance 56 | 5 microhenries |
| Transformer | Turns |
| Primary Coil 56 | 75 |
| Secondary Coils 64–70 | 2.5 |

During operation of the induction heating generator 10, the voltage (R.M.S.) across the load 56 approaches that of the power supply 19, i.e., 160 volts. The output power measured calorimetrically into an inductively coupled water cooled steel load was approximately 350 watts. Approximately 400 watts were measured into a properly matched resistive load.

Figure 2A:
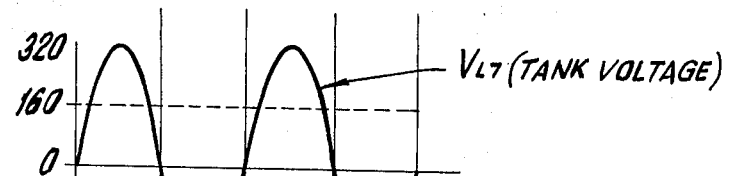
FIGS. 2A-2D are typical waveforms resulting from the induction heating generator of FIG. 1.
Figure 2B:
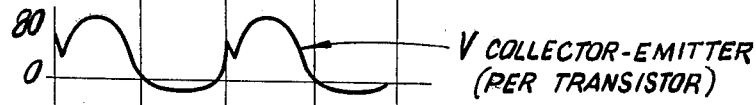
Figure 2C:
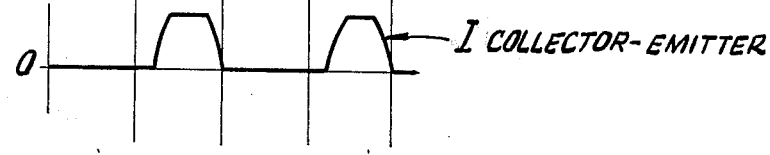
Figure 2D:
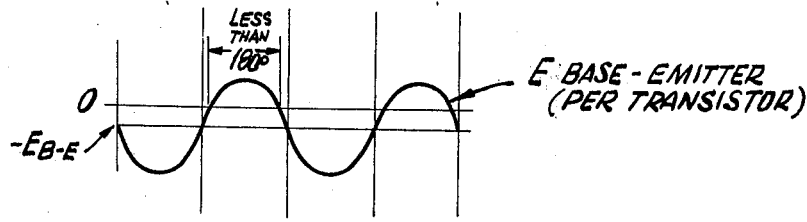

FIG. 2A illustrates the waveform of the tank voltage across the induction heating coil 56. FIG. 2B illustrates the waveform of the voltage appearing across the collector and emitter of each transistor 12–18, showing spikes in the voltage waveform resulting from the cessation of the collector current at the beginning of the non-conduction periods of the transistors 12–18. FIG. 2C illustrates the waveform of the current flowing between the collector and emitter. FIG. 2D illustrates the waveform of the voltage across the base and emitter, showing the reverse voltage limit provided by the diodes 88–94.

It should be understood by those skilled in the art that various modifications may be made in the present invention without departing from the spirit and scope thereof, as described in the specification and defined in the appended claims.

What is claimed is:

1. A high power R.F. induction heating generator for inductively heating a load, comprising:
    a plurality of transistors of the same type series connected in a self-excited class "C" oscillator configuration;
    a tank circuit including a tank coil electrically coupled between the output of said transistors and the load, and having an impedance which matches the output impedance of said transistors for providing an oscillating R.F. voltage signal to the load; and
    feedback transformer means including a primary winding and a plurality of secondary windings corresponding in number to said plurality of transistors, said primary winding being coupled to said tank circuit and said secondary windings being uniformly wound over said primary winding and coupled to the bases of said transistors to provide input voltages of equal phase and amplitude to each of said transistors for synchronizing the conduction and non-conduction periods of said transistors for delivering equal shares of the total power to the load.

2. The high power R.F. induction heating generator recited in claim 1, including:
    power supply means electrically coupled to each of said transistors for supplying D.C. bias voltages thereto.

3. The high power R.F. induction heating generator recited in claim 1, including:
    balancing means for compensating for any unbalance in the operation of said transistors.

4. The high power R.F. induction heating generator recited in claim 1, wherein:
    said feedback transformer includes a toroid with said primary winding uniformly wound around said core and said secondary windings being wound over said primary winding.

5. The high power R.F. induction heating generator recited in claim 4, wherein:
    said toroid is a carbonyl iron core.

6. The high power R.F. induction heating generator recited in claim 2, wherein:
    said tank circuit includes a capacitive divider for providing a tank coil voltage approximately equal to that of said power supply means.

7. The high power R.F. induction heating generator recited in claim 1, including:
    diodes in series with the bases of said transistors to limit the reverse bias voltage applied between the emitter and base during non-conduction periods.

8. The high power R.F. induction heating generator recited in claim 1, including:
    four transistors;
    four secondary windings quadfilar wound over said primary winding.

9. A high power R.F. induction heating generator for inductively heating a load, comprising:
    a plurality of transistors of the same type series connected in a self-excited class "C" oscillator configuration;
    power supply means electrically coupled to each of said transistors for supplying D.C. bias voltage thereto;
    balancing means for compensating for any unbalance in the operation of said transistors;
    a tank circuit including a tank coil electrically coupled between the output of said transistors and the load, and having an impedance which matches the output impedance of said transistors for providing an oscillating R.F. voltage signal to the load;
    feedback transformer means including a toroid having a primary winding and a plurality of secondary windings corresponding in number to said plurality of transistors, said primary winding being uniformly wound around said toroid and coupled to said tank coil and said secondary windings being uniformly wound over said primary winding and coupled to the bases of said transistors to provide input voltages of equal phase and amplitude to each of said transistors for synchronizing the conduction and non-conduction periods of said transistors for delivering equal shares of the total power to the load; and
    diodes connected in series with the bases of said transistors to limit the reverse bias voltage applied between the emitter and base during non-conduction periods.

10. The high power R.F. induction heating generator recited in claim 9, wherein:
    said toroid is a carbonyl iron core;
    said tank circuit includes a capacitive divider for providing a tank coil voltage approximately equal to that of the power supply means.

11. The high power R.F. induction heating generator recited in claim 10, including:
    four transistors;
    four secondary windings quadfilar wound over said primary winding.

* * * * *